United States Patent [19]

Vercellone et al.

[11] Patent Number: 5,775,535
[45] Date of Patent: Jul. 7, 1998

[54] FOOD WARMER WITH BALANCED-MOVEMENT COVER

[75] Inventors: Ferruccio Vercellone; Sergio Sambonet; Fausto Rissone, all of Vercelli, Italy

[73] Assignee: Table Top Engineering & Design, Italy

[21] Appl. No.: 630,972

[22] Filed: Apr. 8, 1996

[51] Int. Cl.[6] .................................................. B65D 43/00
[52] U.S. Cl. ................................................ 220/318; 220/334
[58] Field of Search ................................ 220/318, 334, 220/912, 246, 264

[56] References Cited

U.S. PATENT DOCUMENTS

| 2,325,897 | 8/1943  | Waltman.           |
|-----------|---------|--------------------|
| 2,420,411 | 5/1947  | Blount, Sr. ............... 220/334 X |
| 3,490,756 | 1/1970  | Spier ...................... 220/334 X |
| 3,734,076 | 5/1973  | Kiziol.             |
| 4,649,599 | 3/1987  | Beller.             |
| 5,065,884 | 11/1991 | Naritomi et al. ........... 220/334 X |
| 5,360,132 | 11/1994 | Edelhoff .................. 220/334 |

FOREIGN PATENT DOCUMENTS

| 2756635 | 1/1979 | Germany. |
| 8703185 | 6/1987 | WIPO.    |

*Primary Examiner*—Steven M. Pollard
*Attorney, Agent, or Firm*—Shlesinger, Fitzsimmons & Shlesinger

[57] ABSTRACT

A food warmer (10) has a cover (14) hinged on a frame (11) by means of opposing side hinges (16,17,18,19,22,23) for rotating it around an axis of rotation between a closed position and a fully open position. At least one of the S hinges comprises coupling means (16,18) between the cover and the frame which rotate integrally with the cover against the action of reaction means (20) mounted on the frame. In this manner the action of the reaction means supplies virtual balancing of the moment produced by the weight of the cover.

9 Claims, 3 Drawing Sheets

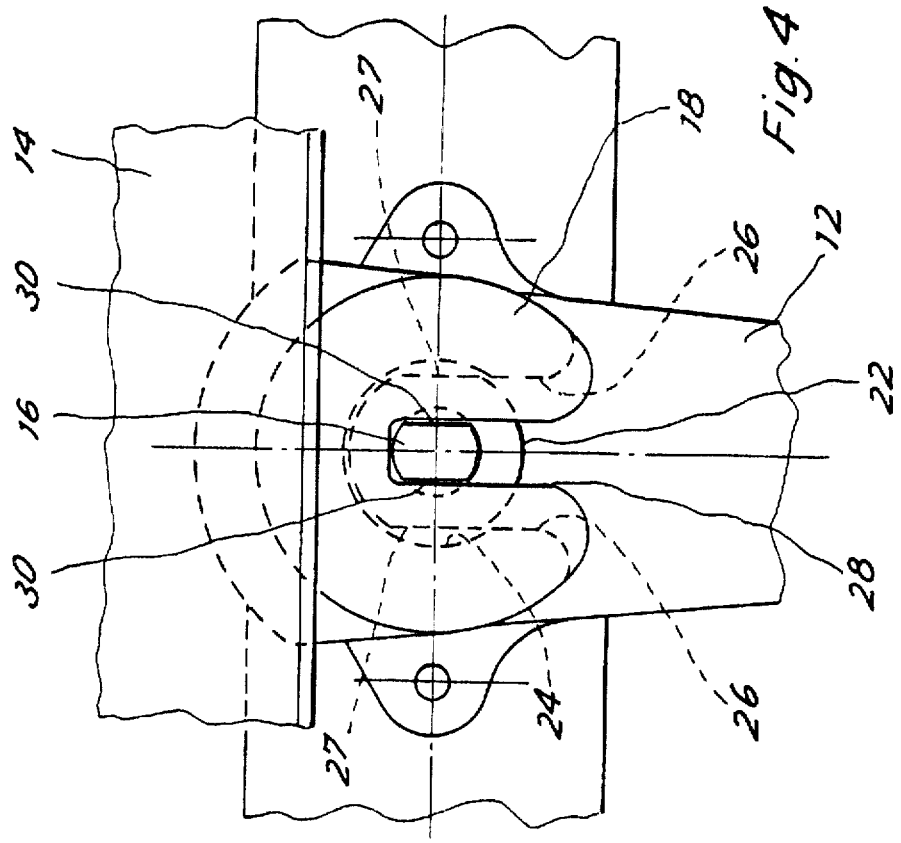
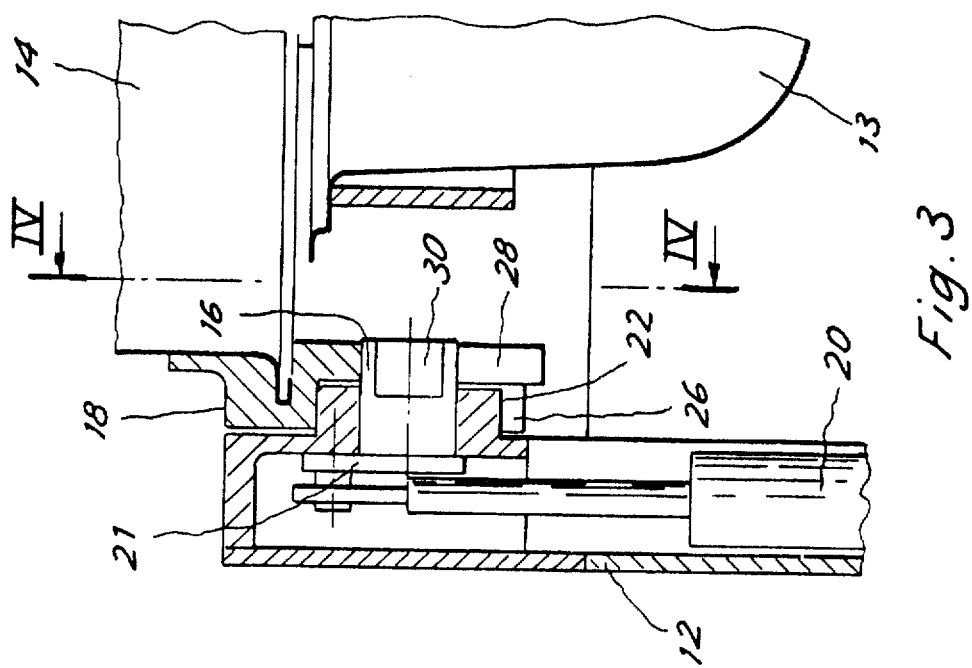

FOOD WARMER WITH BALANCED-MOVEMENT COVER

BACKGROUND OF THE INVENTION

The present invention relates to a food warmer having a cover with balanced movements In the prior art, food warmers of the type comprising a container or tank heated e.g. by means of an underlying recipient containing hot water and on which is placed the food are well known. On their tops, these food warmers have a hinged cover to permit their opening by means of rotation around a horizontal axis. The principal problem with such a structure is that the cover, which is relatively heavy, can easily fall back to its closed position, with obvious problems, especially in the case where opening is performed by inexpert persons. The risk is increased by the fact that usually the person handling the cover has one hand already engaged with a plate on which to set the food taken from the food warmer. Solution of the problem is made difficult by the need to hold the shape of the food warmer within virtually predetermined canons and hence without the possibility of employing those solutions for providing braked or balanced covers available in other fields.

In addition, it is necessary anyway to preserve the ready disassembling of containers, cover and frame for normal operations of frequent cleaning which a food warmer must undergo.

The general purpose of the present invention is to obviate the above mentioned shortcomings by supplying a food warmer with a balanced cover in order to have a neutral movement without disturbing the good appearance of the food warmer and without interfering with disassembly for cleaning.

SUMMARY OF THE INVENTION

In view of this purpose it was thought to provide in accordance with the present invention a food warmer with cover hinged on a frame by means of opposing side hinges for its rotation around an axis of rotation between a closed position and a fully open position and characterized in that at least one of said hinges comprises means of coupling between the cover and the frame which rotate integrally with the cover against the action of reaction means mounted on the frame with the action of the reaction means supplying virtual balancing of the moment produced by the weight of the cover.

BRIEF DESCRIPTION OF THE DRAWINGS

To clarify the explanation of the innovative principles of the present invention and its advantages compared with the known art there is described below by way of non-limiting example with the aid of the annexed drawings a possible embodiment thereof applying said principles. In the drawings:

FIG. 3 shows a partial and enlarged view of a detail of the balanced hinging of the food warmer of FIG. 1, and FIG. 4 shows a view of the detail of the balanced hinging along line of cut IV—IV of FIG. 3.

DETAILED DESCRIPTION OF THE INVENTION

Figure 1:
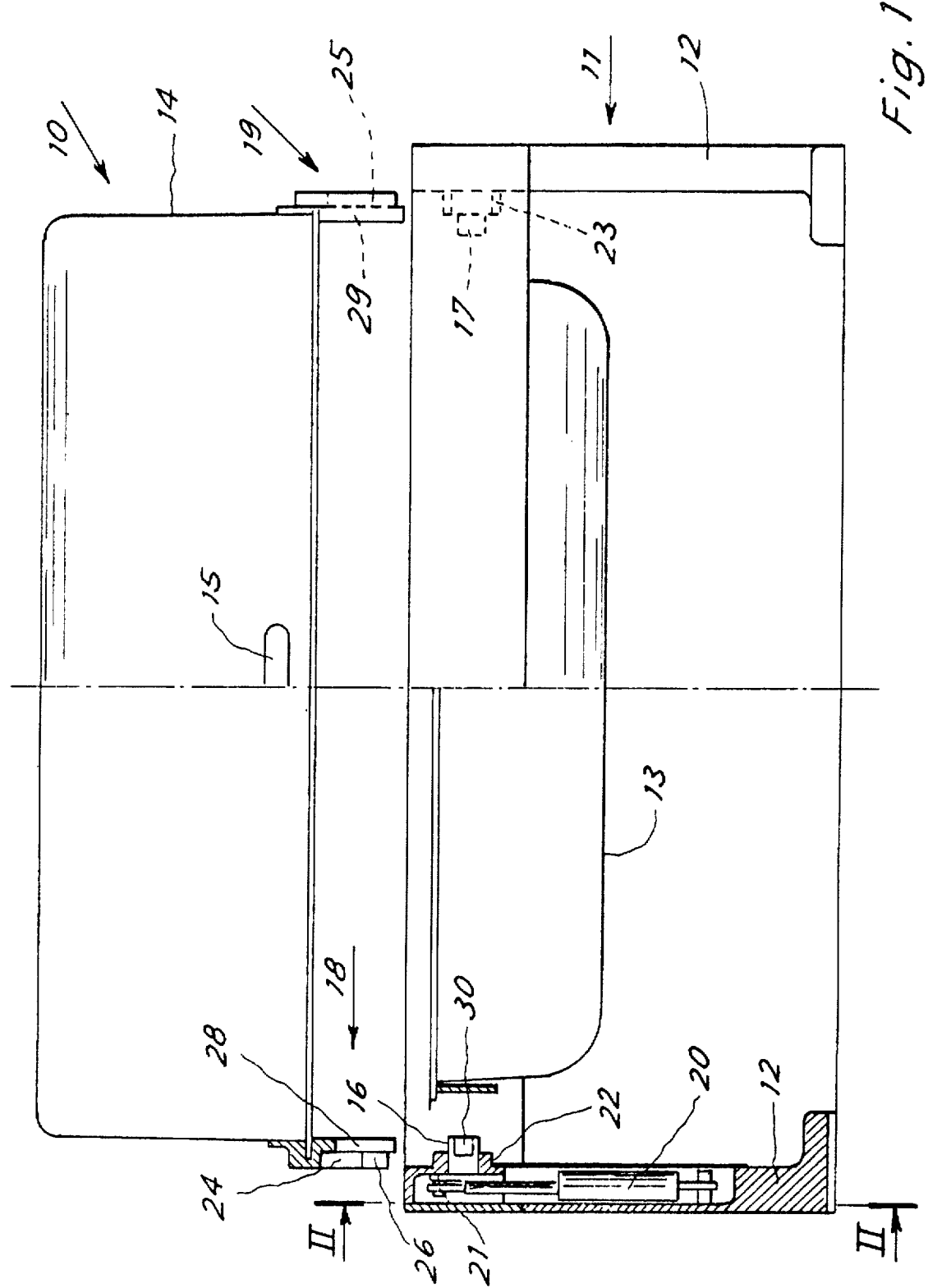
FIG. 1 shows a partially cross sectioned and exploded front view of a food warmer in accordance with the present invention.

With reference to the figures, FIG. 1 shows diagramatically a food warmer indicated generally by reference number 10 and comprising a frame 11 with supporting legs 12 on which is supported a tank 13. During use, on the tank 13 is placed a recipient (not shown) with the food, warmed by a hot water bath in the tank, as known in the field.

To the frame is hinged laterally along a horizontal axis a cover 14 operated by means of a handle 15 for rotating it around the hinge axis and access to the underlying recipient.

In accordance with the present invention the cover has two side brackets 18, 19 which engage in respective supports and facing side pins 16, 17 which identify the axis of rotation of the cover. At least one of the two side pins is connected to a reaction device for counterbalancing the rotation moment produced by the weight of the cover in its various positions between the closed position and the fully open position.

Figure 2:
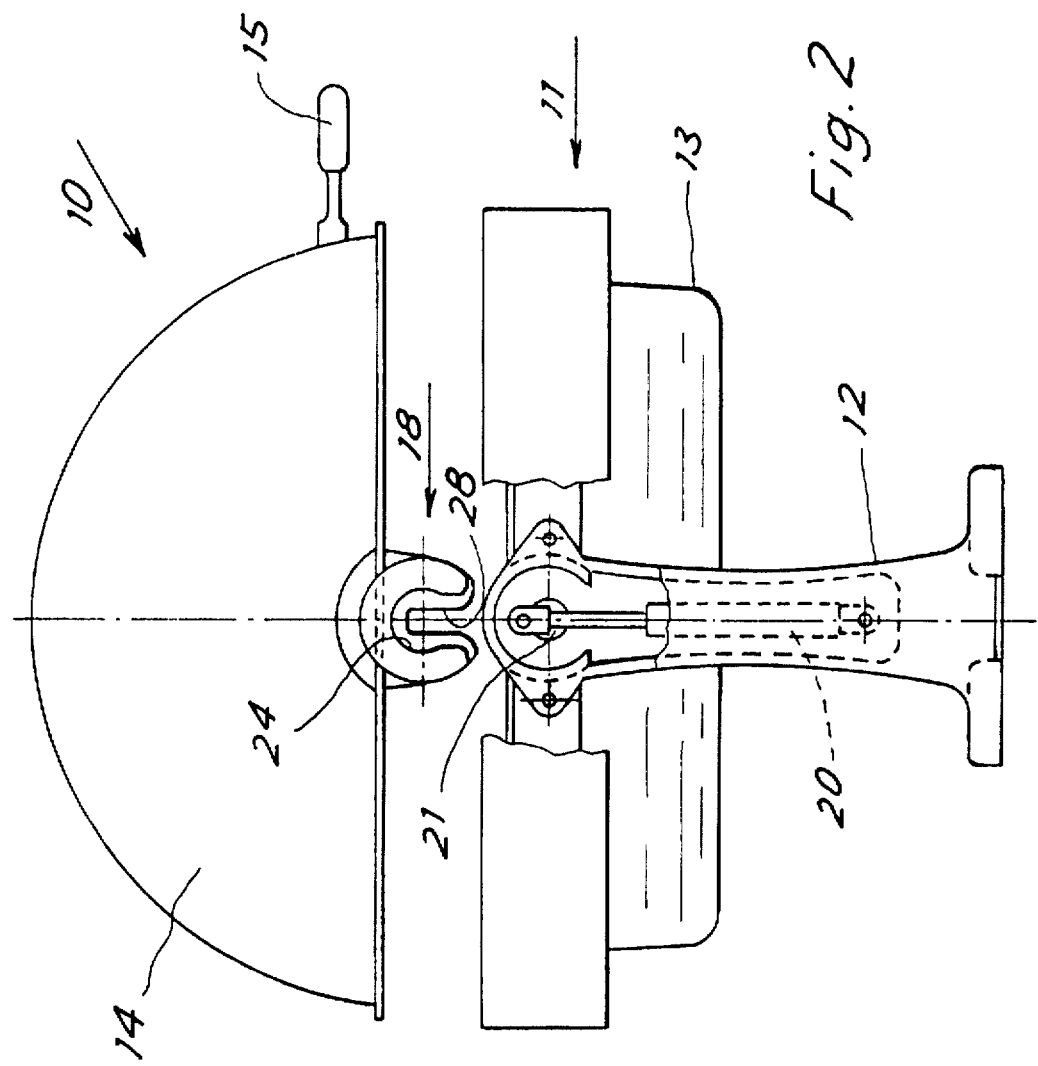
FIG. 2 shows a side view of the food warmer exploded and partially cross sectioned along plane of cut II of FIG. 1.

As may be seen clearly in FIGS. 1 and 2 the reaction device consists of a gas spring advantageously inserted in a seat made in the left supporting leg 12 in FIG. 1. The air spring 20 is connected to one end of the frame and at the other end to the pin 16 by means of a kinematic transmission mechanism such as a crank 21 to convert the rotary movement of the pin into linear movement for the gas spring.

As may be seen clearly in FIG. 2 the engagement brackets 18, 19 of the cover (advantageously provided with a virtually cylindrical shape around the rotation axis) have a forked conformation for engagement in the respective pins 16, 17 upon vertical lowering of the cover. In FIGS. 3 and 4 is shown in greater detail the coupling between the fork and the left support with the other being virtually equivalent and thus not shown in detail.

The pins 16, 17 project axially from respective supports 22, 23 integral with the frame and cylindrical in shape with their axes coinciding with the axes of the pins. Each cylindrical support can be received in a complementary seat with cylindrical wall 24, 25 made in the respective fork. As clearly seen in FIG. 4 for the left coupling, to permit insertion of the cylindrical supports in the cylindrical seats each seat 24, 25 has a peripheral opening 26 having a breadth less than its diameter and each support 22, 23 has a lateral flattening 27 along two parallel chords to become narrower at the width of the opening. In this manner the cover can be lowered vertically (in closed position) onto the frame with the forks engaging with the hingeing supports 22, 23 as shown in FIG. 4. Upon rotation of the cover the flattened side walls 27 of the supports become misaligned with the opening 26 of the cylindrical seats of the forks and thus the cover can rotate but not detach itself accidentally from the frame 11.

Each fork also has a groove or slot 28, 29 parallel to the opening 26 and open in the same direction to receive the part of the pin 16, 17 projecting from the respective supports 22, 23.

As may be clearly seen in FIGS. 3 and 4 the pin 16 connected to the gas spring has a part projecting from the support 22 which is laterally flattened to identify flat parallel walls 30 which couple with minimum play in the grooves 28 provided with appropriate width so as to constitute a faceted gain to make rotation of the pin and the cover integral.

If the opposite pin 17 is also equipped with a gas spring the pin 17 and the corresponding groove 29 can also be provided with integral coupling for rotation. As an alternative the pin 17 can be provided cylindrical without flattening and the groove 29 can have breadth sufficient to receive it freely or the pin 17 can be omitted entirely with the cover rotating on the support 23.

In use the cover is mounted easily by lowering it vertically in the closed position as may be clearly seen in FIGS. 1 and 2 so that the pins and supports couple with their respective seats in the forks. By rotating the cover towards the open position the crank 21 increasingly loads the spring or the gas springs and increases its arm to supply a force which balances instant by instant the rotation movement produced by the weight of the cover whose center of gravity draws away from the vertical plane containing the axes of the pins.

As is readily imaginable to those skilled in the art, by selecting appropriately the thrust of the gas spring and the offset of the crank it is possible to perfectly balance the cover so that is has neutral behaviour in any open position.

It is now clear that the set purposes have been achieved by supplying a food warmer which externally keeps its conventional form without visible mechanisms and which has however a perfectly balanced cover. At the same time the food warmer in accordance with the present invention remains easy to open for cleaning with the cover separating from the base by means of mere vertical lifting. In addition, the opening movement of the cover remains of considerable width, e.g approximately 170 degrees.

Naturally the above description of an embodiment applying the innovative principles of the present invention is given merely by way of example and therefore is not to be taken as a limitation of the patent right claimed here. For example, the spring or the gas springs can be positioned in positions alternative to that shown in the drawings, for example a horizontal position inside the ring of the frame surrounding the tank. In addition, the kinematic transmission mechanism for the motion between the pin and the gas spring can be different from that of the crank and can be-provided e.g by means of a cam or a geared coupling. Lastly, the reaction means can be different from a gas spring.

What is claimed is:

1. In a food warmer including a removable cover hinged on a frame by means of opposing side hinges for rotating the cover around an axis of rotation between a closed position and a fully open position and characterized in that at least one of the hinges comprises coupling means interposed between the cover and the frame, and which rotate with the cover, and reaction means mounted on the frame and connected with the coupling means for supplying substantial balancing action of the moment produced by the weight of the cover during rotation thereof, said coupling means comprising a pin with a faceted lateral surface supported in a rotatable manner on the frame in a position axial with the cover rotation axis, and a fork integral with the cover and having therein a slot for releasably receiving the pin transversely thereof and constituting an engagement causing the pin to be rotatable with the cover, the pin being connected to said reaction means to be rotatable against the action thereof.

2. Food warmer in accordance with claim 1 and characterized in that the facets of the pin and the extension of the slot in the fork are direct to allow withdrawal of the fork from the pin by means of lifting the cover vertically when the cover is in the closed position.

3. Food warmer in accordance with claim 1 and characterized in that the pin is connected to the reaction means through a crank integral therewith.

4. Food warmer in accordance with claim 1 and characterized in that the reaction means comprise a gas spring.

5. Food warmer in accordance with claim 1 and characterized in that the hinges comprise each a fork integral with the cover and having a seat which engages in a rotatable manner in a complementary support which projects from the frame coaxially with the cover rotation axis.

6. Food warmer in accordance with claim 5 and characterized in that the supports have virtually cylindrical lateral surfaces around the cover rotation axis with the complementary seat for receiving the respective support having a lateral opening of a breadth less than the diameter of the support with the support having lateral flattening to pass through said opening when the cover is in a predetermined angular position.

7. Food warmer in accordance with claim 6 and characterized in that the angular position corresponds to the cover in closed position.

8. Food warmer in accordance with claim 1 and characterized in that the frame comprises lateral supporting legs with the reaction means being inserted in one of said legs.

9. In a food warmer including a removable cover hinged on a frame by means of opposing side hinges for rotating the cover around an axis of rotation between a closed position and a fully open position and characterized in that at least one of the hinges comprises coupling means interposed between the cover and the frame, and which rotate with the cover, and reaction means mounted on the frame and connected with the coupling means for supplying substantial balancing action of the moment produced by the weight of the cover during rotation thereof, said coupling means comprising a pin having a faceted lateral surface and supported in a rotatable manner on the frame in a position axial with the cover rotation axis, and a fork integral with the cover and having therein a slot for receiving the pin transversely thereof and constituting an engagement causing the pin to be rotatable with the cover, the pin being connected to said reaction means to be rotatable against the action thereof, said reaction means comprising a gas spring, and said frame comprising lateral supporting legs with the reaction means being inserted in one of said legs.

\* \* \* \* \*